United States Patent [19]

Moriya et al.

[11] Patent Number: 4,731,187

[45] Date of Patent: Mar. 15, 1988

[54] REMOVAL OF HEAVY METALS FROM WASTE WATER

[75] Inventors: Masafumi Moriya, Kasukabe; Kazuo Hosoda, Saitama; Akira Nishimura, Asaka; Takao Imachi, Chiba, all of Japan

[73] Assignee: Miyoshi Yushi Kabushiki Kaisha, Tokyo

[21] Appl. No.: 887,945

[22] Filed: Jul. 22, 1986

[30] Foreign Application Priority Data

Aug. 5, 1985 [JP] Japan .................................. 60-172128
Sep. 17, 1985 [JP] Japan .................................. 60-204629

[51] Int. Cl.$^4$ ................................................ C02F 1/54
[52] U.S. Cl. ...................................... 210/719; 210/720; 210/725; 210/727; 210/912; 210/913; 210/914
[58] Field of Search ............... 210/719, 720, 723, 725, 210/727, 728, 729, 732, 912, 913, 914

[56] References Cited

U.S. PATENT DOCUMENTS 3,981,965  9/1976  Ganey et al. ........................... 423/55
4,530,765  7/1985  Sabherwal ............................. 210/912

FOREIGN PATENT DOCUMENTS 1454342  11/1976  United Kingdom .

OTHER PUBLICATIONS

Kim, B. M. "Treatment of Metal Containing Wastewater by Sulfide Precipitation" General Electric Company, AIChE 73rd Annual Meeting, Chicago, Ill., Nov. 1980, pp. 1–12.

*Primary Examiner*—Peter Hruskoci
*Assistant Examiner*—Jeffrey W. Peterson

[57] ABSTRACT

A heavy metal can be removed from waste water, in which the metal is contained as ions, by adding to the waste water a metal scavenger together with at least one of sodium monosulfide, sodium polysulfides and sodium hydrogensulfide to form a metal ion containing floc. The resulting floc is then removed from the waste water by filtration. The metal scavenger contains at least one carbodithio group and/or at least one carbodithioate salt group as N-substituents per molecule.

8 Claims, No Drawings

REMOVAL OF HEAVY METALS FROM WASTE WATER

This invention relates to a metal scavenging process.

As more and more problems are caused by contamination of rivers, sea and the like by waste water from factories and the like in recent years, stricter regulations have been enacted to avoid contamination by waste water. It is now a mandatory requirement to control metals in waste water below their corresponding prescribed concentrations. Particularly stringent regulations have been established against heavy metals harmful to human bodies, such as mercury, cadmium, zinc, copper and chromium. Accordingly, various processes have been proposed to remove heavy metal ions in waste water. As processes of this sort, there have been known ion flotation, ion exchange, electrolytic floating process, electrodialysis, reverse osmosis, neutralizing coagulation and sedimentation process in which an alkaline neutralizing agent such as slaked lime or caustic soda is thrown to convert metal ions into their hydroxides, which are then caused to coagulate and precipitate with a high molecular flocculant, etc. It has also been known to insolubilize metal ions in waste water by using a metal scavenger, thereby causing the metal ions to precipitate for their removal. As metal scavengers of this sort, metal scavengers containing dithiocarbamic acid compounds, each of which has a structure formed of a monoamine such as dialkylmonoamine or diphenylmonoamine and one dithiocarboxyl group bonded to the nitrogen atom of the monoamine (Japanese patent Laid-Open No. 140360/1976), compounds of a structure obtained as a result of addition polymerization between a compound containing two acryloyl groups and an amino acid containing two N-bonded hydrogen atoms (Japanese patent Publication No. 10999/1979), aliphatic polydithiocarbamic acids or their salts (Japanese patent Laid-Open No. 99978/1974), or the like.

Ion flotation, ion exchange, electrolytic floating process, electrodialysis and reverse osmosis process are however dissatisfactory with respect to the removal rate of heavy metals, operability, running cost, etc. Under the circumstances, they are used only for certain special waste water treatments. On the other hand, the neutralizing coagulation and sedimentation process leads to production of metal hydroxide sludge in an enormous volume. Since this metal hydroxide sludge has poor dewatering characteristics and is bulky, it is accompanied by a drawback that its transportation is difficult. In addition, it is very difficult to lower the contents of heavy metals in the metal hydroxide sludge below their corresponding levels specified by the effluent standard. Moreover, this sludge involves a further problem that it may be dissolved again to develop a secondary pollution depending on the manner of its disposal. Further, the metal scavengers described in Japanese patent Laid-Open No. 140360/1976 and Japanese patent Publication No. 10999/1979 have problems in their affinity to metal ions, so that they are not considered to achieve the removal of metal ions at sufficient removal rates from waste water.

They are accompanied by another shortcoming that the resulting floc formed as a result of scavenging of metal ions requires lots of time for its settling and no efficient treatment is thus always feasible.

With the foregoing in view, the present inventors have carried out an extensive investigation. As a result, it has been found that combined use of a metal scavenger, which contains at least one carbodithio group and/or at least one carbodithioate salt group as N-substituents per molecule, and at least one of sodium monosulfide, sodium polysulfides and sodium hydrogensulfide permits the most efficient scavenging of metal ions from waste water, moreover, without failure. The above finding has then led to completion of the present invention.

In one aspect of this invention, there is thus provided a process for scavenging metal ions, which comprises adding a metal scavenger, which contains at least one carbodithio group and/or at least one carbodithioate salt group as N-substituents per molecule, together with at least one of sodium monosulfide, sodium polysulfides and sodium hydrogensulfide to waste water containing metal ions so as to scavenge and remove the metal ions from the waste water.

According to the process of this invention in which the metal scavenger, which contains at least one carbodithio group and/or at least one carbodithioate salt group as N-substituents per molecule, is added together with at least one of sodium monosulfide, sodium polysulfides and sodium hydrogensulfide to waste water so as to remove metal ions in waste water. Compared with processes making use of conventional metal scavengers, the process of this invention can achieve efficient and satisfactory scavenging and removal of metal ions from waste water even at lower metal scavenger concentrations. Although the metal scavenger useful in the practice of this invention can still scavenge and remove metal ions to a sufficient extent even when used singly, its combined use with at least one of sodium monosulfide, sodium polysulfides and sodium hydrogensulfide leads to synergistic effects, thereby bringing about an advantageous effect that compared with sole use of the metal scavenger, the settling velocity of floc is faster and metal ions can hence be scavenged and removed with extremely good efficiency from waste water.

The above and other objects, features and advantages of this invention will become apparent from the following description of the invention and the appended claims.

The metal scavenger useful in the practice of this invention is a compound containing, as N-substituent or substituents substituted for active hydrogen atom or atoms bonded to the nitrogen atom in the molecule of a polyamine with a primary amino group and/or secondary amino group, at least one carbodithio group, —CSSH, and/or at least one carbodithioate salt group, e.g., its alkali metal salt such as sodium or potassium salt, its alkaline earth metal salt such as calcium salt, its ammonium salt or the like. A metal scavenger containing at least one dithiocarboxyl group as an N-substituent per molecule can be obtained, for example, by reacting carbon disulfide with a polyamine. The active hydrogen atom of the carbodithio group can be substituted with an alkali metal, alkaline earth metal, ammonium or the like to convert the carbodithio group into the corresponding carbodithioate group by treating the above metal scavenger with an alkali such as sodium hydroxide, potassium hydroxide or ammonium hydroxide after the above reaction or by conducting the above reaction in the presence of an alkali. The reaction between the polyamine and carbon disulfide may preferably be conducted in a solvent, preferably, water or an alcohol at 30°–100° C. for 1–10 hours, especially at 40°–70° C. for 2–5 hours.

As exemplary polyamines, may be mentioned polyalkylenepolyamines such as ethylenediamine, propylenediamine, butylenediamine, hexamethylenediamine, diethylenetriamine, dipropylenetriamine, dibutylenetriamine, triethylenetetramine, tripropylenetetramine, tributylenetetramine, tetraethylenepentamine, tetrapropylenepentamine, tetrabutylenepentamine and pentaethylenehexamine; aniline; phenylenediamine; xylenediamine; methaxylenediamine; iminobispropylamine; monomethylaminopropylamine; methyliminobispropylamine; 1,3-bis(aminomethyl)cyclohexane; 3,5-diaminochlorobenzene; melamine; 1-aminoethylpiperazine; piperazine; 3,3'-dichlorobenzidine; diaminophenyl ether; tolidine base; m-toluylenediamine; and polyethylenepolyimine (average molecular weight: 100–100,000, preferably 300 or higher); and so on. In addition, N-substituted polyamines containing alkyl groups, β-hydroxy alkyl groups, acyl group and the like, such as acylpolyamines may also be used. These N-substituted polyamines can be obtained by reacting alkyl halides, epoxyalkanes and fatty acid derivatives with the above-described polyamines. As N-alkylpolyamines, there may be mentioned N-alkylethylenediamines, N-alkylpropylenediamines, N-alkylhexamethylenediamines, N-alkylphenylenediamines, N-alkylxylenediamines, N-alkyldiethylenetriamines, N-alkyltriethylenetetramines, N-alkyltetraethylenepentamines, N-alkylpentaethylenehexamine, etc. The above N-substituted alkyl groups may preferably have 2 to 18 carbon atoms. N-hydroxyalkylpolyamines may preferably be those with β-hydroxyalkyl groups the carbon number of which range from 2 to 30, including, for example, β-hydroxyethyl, β-hydroxypropyl, β-hydroxybutyl, β-hydroxydodecyl, β-hydroxytetradecyl, β-hydroxyhexadecyl, β-hydroxyoctadecyl, β-hydroxyoctacosyl, etc. As epoxyalkanes usable for introducing β-hydroxyalkyl groups, may for example be mentioned ethylene oxide, propylene oxide, buthylene oxide, α-olefin oxides (carbon number: 6–30), etc. As N-acylpolyamines, those with acyl groups having 2–30 carbon atoms are preferred. Illustrative N-acylpolyamines may include N-acetylpolyamine, N-propionylpolyamine, N-butyrylpolyamine, N-caproylpolyamine, N-lauroylpolyamine, N-oleoylpolyamine, N-myristyloylpolyamine, N-stearoylpolyamine, N-behenoylpolyamine, and so on. The above-described polyamines and N-substituted polyamines may be used either singly or in combination.

In the metal scavenging process of this invention, the above-mentioned metal scavenger is added together with at least one of sodium monosulfide, sodium polysulfides and sodium hydrogensulfide to waste water so as to scavenge and remove metal ions from the waste water. The settling characteristic of the resulting floc is good and an efficient waste water treatment is feasible, especially, when a sodium polysulfide or sodium hydrogensulfide is employed. As the sodium polysulfides, may be employed sodium disulfide, sodium trisulfide, sodium tetrasulfide or sodium pentasulfide. The objects of this invention can be attained so long as the weight ratio of the metal scavenger to the sodium sulfide falls within a range of from 1:99 to 99:1 with 20:80 to 98:2 being particularly preferred. The metal scavenger and sodium sulfide may be mixed together in advance and then added to waste water. Alternatively, they may be separately added to waste water. It is however preferred to add them after mixing them together beforehand. When they are added separately, their metal-ion removing effects are substantially equal no matter whether the metal scavenger is added first and the sodium sulfide is then added or they are added in the opposite order.

Although the metal scavenger of this invention can be used alone, its combined use with the above-described sodium sulfide permits formation of greater floc, thereby reducing the time required for allowing the floc to settle and achieving more efficient scavenging of metal ions from waste water. The above-mentioned sodium sulfide has complexforming activity for metal ions. Since the resulting floc is extremely small when used singly, it is difficult to allow the floc to settle for its removal. The sodium sulfide can achieve efficient scavenging of metal ions from waste water for the first time when it is used in combination with the above-described metal scavenger. This effect appears to be brought about by a synergistic effect of the complex-forming activity of the metal scavenger, which is useful in the practice of this invention, for metal ions and that of the sodium sulfide for metal ions. It is therefore preferable to add the metal scavenger and sodium sulfide in a total amount of 0.7–4 mole equivalents or especially 0.9–1.5 mole equivalents based on the amount of metal ions in waste water.

Upon adding the metal scavenger and sodium sulfide to waste water to scavenge and remove metal ions from the waste water in accordance with this invention, it is preferable to adjust the pH of the waste water to 3–10 or notably 4–9. As an acid or alkali to be employed for the pH adjustment, any acid or alkali may be used so long as it does not impair floc formation. However, in general, hydrochloric acid, sulfuric acid, nitric acid or the like is employed as an acid while sodium hydroxide, potassium hydroxide, calcium hydroxide or the like is used as an alkali.

According to the process of this invention, it is possible to scavenge mercury, cadmium, zinc, lead, copper, chromium, arsenic, gold, silver, platinum, vanadium, thallium and the like efficiently for their removal.

The present invention will hereinafter be described in further detail by the following Examples:

EXAMPLE 1

In a 4-neck flask fitted with a stirrer, thermometer, dropping funnel and reflux condenser, 40 g of ethylenediamine and 536 g of a 20% aqueous solution of sodium hydroxide were charged. While stirring the contents vigorously at 40° C., 203.7 g of carbon disulfide was added dropwise from the dropping funnel. Subsequent to completion of the dropwise addition, the reaction mixture was aged at the same temperature for 4 hours. The reaction mixture was thereafter poured in a large volume of acetone so that a precipitate was formed. The precipitate was subjected to reprecipitation three times from a water-acetone system for its purification. The precipitate was then dried under reduced pressure, thereby obtaining 260 g of a metal scavenger as powder. The metal scavenger contained a sodium dithiocarboxylate group as an N-substituent and had a sulfur content of 55.8 wt. %.

Sixty-six milligram portions of a mixture, which had been obtained by mixing 50 g of sodium hydrogen-sulfide with 100 g of the above metal scavenger, were added separately to 1000 m; samples of four types of aqueous solutions, i.e., a copper-ion containing aqueous solution ($Cu^{2+}$ content=50 ppm, pH=5.0), a cadmium-ion containing aqueous solution ($Cd^{2+}$ content =50 ppm, pH=5.0), a mercury-ion containing aqueous solution ($Hg^{2+}$ content=50 ppm, pH=5.0) and a lead-ion containing aqueous solution ($Pb^{2+}$ content=50 ppm, pH=5.0). After stirring each of the resultant mixture for 5 minutes, it was allowed to stand so as to measure the time required until the precipitation of the resultant floc. Results are shown in Table 1. Subsequent to removal of the floc by filtration, the concentration of the corresponding metal ions still remaining in the filtrate was measured by atomic-absorption spectroscopy. Measurement results and the volumes of the resultant flocs are also given in Table 1.

EXAMPLE 2

Charged in a reactor similar to that employed in Example 1 were 101 g of triethyltetramine and 464 g of a 20% aqueous solution of sodium hydroxide. After reacting 176.3 g of carbon disulfide in the same manner as in Example 1, the resultant precipitate was purified and dried to obtain 265 g of a metal scavenger as powder. The metal scavenger contained a sodium dithiocarboxylate group as an N-substituent and had a sulfur content of 44.8 wt. %.

Sixty-two milligram portions of a mixture, which had been obtained by mixing 75 g of sodium pentasulfide with 100 g of the above metal scavenger, were separately added to 1000 ml; samples of the same types of aqueous solutions as those employed in Example 1. Following the procedures of Example 1, the floc precipitation time periods, amounts of formed flocs, and the concentrations of the metal ions still remaining in the filtrates were measured. Results are shown in Table 1.

EXAMPLE 3

Charged in a reactor similar to that employed in Example 1 were 48.5 g of diethylenetriamine and 312 g of water. The contents were heated to 60° C., at which 145.9 g of carbon disulfide was added dropwise from a dropping funnel. After completion of the dropwise addition, aging was carried out at the same temperature. The reaction mixture was then heated to 70°-75° C., followed by an addition of 384 g of a 20% aqueous solution of sodium hydroxide. They were reacted for 1.5 hours. Thereafter, the resultant precipitate was purified and dried in the same manner as in Example 1 to obtain 179.8 g of a metal scavenger as powder. The metal scavenger contained a sodium dithiocarboxylate group as an N-substituent and had a sulfur content of 50.3 wt. %.

Seventy-two milligram portions of a mixture, which had been obtained by mixing 25 g of sodium hydrogensulfide and 25 g of sodium pentasulfide with 100 g of the above metal scavenger, were separately added to 1000 ml; samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 4

Charged in a reactor similar to that employed in Example 1 was 372 g of water, followed by dispersion of 70.7 g of finely-ground hexamethylenediamine. At 40° C., 141.4 g of carbon disulfide was added dropwise. After completion of the dropwise addition, aging was carried out at the same temperature. Then, 248 g of a 30% aqueous solution of sodium hydroxide was added and the reaction mixture was heated to 50° C., at which they were reacted for 1.5 hours. After completion of the reaction, the resultant insoluble matter was collected by filtration. After washing the insoluble matter with water and then with acetone, it was ground and then dried under reduced pressure to obtain 208.7 g of a metal scavenger in a ground form. The metal scavenger contained a sodium dithiocarboxylate group as an N-substituent and had a sulfur content of 46.5 wt. %.

Fifty-nine milligram portions of a mixture, which had been obtained by mixing 75 g of sodium tetrasulfide with 100 g of the above metal scavenger, were separately added to 1000 ml; samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 5

Charged in a reactor similar to that employed in Example 1 were 89 g of phenylenediamine, 282 g of a 1:1 mixture of water and acetone and 398 g of a 20 wt. % aqueous solution of sodium hydroxide, followed by an addition of 96 g of carbon dioxide under pressure at 80° C. At the same temperature, they were reacted for 3 hours. The precipitate was then purified in the same manner as in Example 1, thereby obtaining 244.9 g of a metal scavenger having sulfur content of 42.9 wt. %.

Seventy-six milligram portions of a mixture, which had been obtained by mixing 50 g of sodium hydrogensulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 6

Charged in a reactor similar to that employed in Example 1 were 90.2 g of N-propyltriethylenetetramine and 640 g of a 15% aqueous solution of sodium hydroxide. After reacting 172.8 g of carbon disulfide in the same manner as in Example 1, the resulting precipitate was purified and then dried to obtain 301.9 g of a metal scavenger containing a dithiocarboxyl group as an N-substituent and having a sulfur content of 40.8 wt. %.

Fifty-two milligram portions of a mixture, which had been obtained by mixing 100 g of sodium pentasulfide with 100 g of the above metal scavenger, were separately added to 1000 ml; samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 7

Seventy-six milligram portions of a mixture, which had been obtained by mixing 50 g of sodium monosulfide with 100 g of the same metal scavenger as that obtained in Example 5, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 8

Fifty-two milligram portions of a mixture, which had been obtained by mixing 100 g of sodium monosulfide with 100 g of the same metal scavenger as that obtained in Example 6, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 9

Charged in a reactor similar to that employed in Example 1 were 100 g of a 30% aqueous solution of polyethyleneimine ($\overline{MW}=5,000$) and 140 g of a 10% aqueous solution of sodium hydroxide, followed by a dropwise addition of 26.6 g of carbon disulfide at 35°–40° C. After completion of the dropwise addition, they were reacted at 55°–60° C. for 2 hours. After completion of the reaction, the resultant insoluble matter was collected by filtration. After washing the insoluble matter with water and then with acetone, it was dried under reduced pressure to obtain 57.2 g of a metal scavenger having a sulfur content of 33.3 wt. %.

Eighty milligram portions of a mixture, which had been obtained by mixing 30 g of sodium hydrogen-sulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 10

Charged in a reactor similar to that employed in Example 1 were 106 g of N-(β-hydroxylauryl)ethylenediamine and 90 g of a 20% aqueous solution of sodium hydroxide. While vigorously agitating the contents at 40° C., 33 g of carbon disulfide was added dropwise from a dropping funnel. After completion of the dropwise addition, aging was carried out for 4 hours at the same temperature. The reaction mixture was then poured in a great deal of acetone to form a precipitate. After subjecting the precipitate to reprecipitation three times from a water-acetone system and purifying the same, the precipitate was dried under reduced pressure to obtain 125 g of a metal scavenger having a sulfur content of 17.5 wt. %.

Portions, each of 0.3 g, of a mixture, which had been obtained by mixing 30 g of sodium monosulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 1.

EXAMPLE 11

Charged in a reactor similar to that employed in Example 1 were 118 g of N-(β-hydroxyoctyl)triethyltetramine and 180 g of a 20% aqueous solution of sodium hydroxide. After reacting 66 g of carbon disulfide in the same manner as in Example 1, the resultant precipitate was purified and dried to obtain 195 g of a metal scavenger as pale yellow powder. The metal scavenger had a sulfur content of 26.8 wt. %.

Portions, each of 0.3 g, of a mixture, which had been obtained by mixing 30 g of sodium pentasulfide with 100 g of the above metal scavenger, were separately added to 1000 ml samples of the same types of aqueous solutions as those employed in Example 1. Following the procedures of Example 1, the floc precipitation time periods, amounts of formed flocs, and the concentrations of the metal ions still remaining in the filtrates were measured. Results are shown in Table 2.

EXAMPLE 12

Charged in a reactor similar to that employed in Example 1 were 173 g of N,N'''-bis(β-hydroxyoctyl)-triethylenetetramine and 360 g of a 20% aqueous solution of sodium hydroxide. After reacting 66 g of carbon disulfide in the same manner as in Example 1, the resultant precipitate was purified and dried to obtain 286 g of a metal scavenger as pale yellowish white powder. The metal scavenger had a sulfur content of 19.1 wt. %.

Portions, each of 0.4 g, of a mixture, which had been obtained by mixing 20 g of sodium hydrogensulfide with 100 g of the above metal scavenger, were separately added to 1000 ml samples of the same types of aqueous solutions as those employed in Example 1. Following the procedures of Example 1, the floc precipitation time periods, amounts of formed flocs, and the concentrations of the metal ions still remaining in the filtrates were measured. Results are shown in Table 2.

EXAMPLE 13

Charged in a reactor similar to that employed in Example 1 were 167 g of N-(β-hydroxyhexadecyl)diethylenetriamine and 200 g of water. The contents were then heated to 60° C., at which 44 g of carbon disulfide was added dropwise from a dropping funnel. After completion of the dropwise addition, aging was carried out for 4 hours at the same temperature. The reaction mixture was then heated to 70°–75° C., followed by an addition of 120 g of a 20% aqueous solution of sodium hydroxide to proceed with a reaction for 1.5 hours. Thereafter, the resultant precipitate was purified and dried in the same manner as in Example 1 to obtain 207 g of a metal scavenger as pale reddish brown powder. The metal scavenger had a sulfur content of 15.7 wt. %.

Portions, each of 0.3 g, of a mixture, which had been obtained by mixing 20 g of sodium monosulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 14

Charged in a reactor similar to that employed in Example 1 was 429 g of water, followed by dispersion of 299 g of finely-ground N-(β-hydroxyoctacosyl)hexamethylenediamine. At 40° C., 47 g of carbon disulfide was added dropwise. After completion of the dropwise addition, aging was carried out at the same temperature. Then, 74 g of a 30% aqueous solution of sodium hydroxide was added and the reaction mixture was heated to 50° C., at which they were reacted for 1.5 hours. After completion of the reaction, the resultant insoluble matter was collected by filtration. After washing the insoluble matter with water and then with acetone, it was ground and then dried under reduced pressure to obtain 306 g of a yellowish metal scavenger in a ground form. The metal scavenger had a sulfur content of 12.5 wt. %.

Portions, each of 0.4 g, of a mixture, which had been obtained by mixing 20 g of sodium monosulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE -

Ninety-nine grams of a commercial polyethylenepolyimine (product of Nippon Shokubai Kagaku Kogyo Co., Ltd.; "Epomin SP-300", trade name; average molecular weight: 30,000) were dissolved in 146 g of ethyl alcohol. While heating the solution to 75° C. and stirring it at the same temperature, 212 g of an epoxyalkane (carbon number: 12) was added dropwise under reflux. After completion of the dropwise addition, the reaction mixture was maintained at the same temperature for 2 hours and was then concentrated, thereby obtaining 231 g of yellowish crystalline solid matter. Two hundred grams of the crystalline solid matter were finely comminuted and then dispersed in 200 g of water. Twenty grams of sodium hydroxide were then added, followed by a dropwise addition of 32 g of carbon dioxide at 40° C. After the dropwise addition, their reaction was caused to proceed at the same temperature for 2 hours. After completion of the reaction, insoluble matter was collected by filtration. After washing the insoluble matter with water and then with acetone, it was dried under reduced pressure to obtain 241 g of a yellowish metal scavenger in a ground form. The metal scavenger had a sulfur content of 10.1 wt. %.

Portions, each of 0.3 g, of a mixture, which had been obtained by mixing 30 g of sodium pentasulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 16

After dissolving 200 g of the same crystalline solid matter as that obtained in Example 15, which had been obtained by reacting the an epoxyalkane with polyethyleneimine, in 58 g of concentrated aqueous ammonia, the resulting solution was dispersed in 300 g of water, followed by a dropwise addition of 32 g of carbon disulfide at 40° C. After the dropwise addition, their reaction was caused to proceed at the same temperature for 2 hours. After completion of the reaction, insoluble matter was collected by filtration. After washing the insoluble matter with water and then with acetone, it was dried under reduced pressure to obtain 239 g of a yellowish metal scavenger in a ground form. The metal scavenger had a sulfur content, of 10.8 wt. %.

Portions, each of 0.3 g, of a mixture, which had been obtained by mixing 15 g of sodium monosulfide and 15 g of sodium pentasulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 17

One hundred grams of the metal scavenger obtained in Example 15 was dispersed in 200 g of water, followed by an addition of 24 g of ammonium chloride. They were reacted at 50° C. for 4 hours. After completion of the reaction, insoluble matter was collected by filtration. After washing the insoluble matter with water and then with acetone, it was dried under reduced pressure to obtain 95 g of a yellowish metal scavenger having a sulfur content of 11.5 wt. %. In the metal scavenger, the active hydrogen atom of dithiocarboxyl group had been substituted by an ammonium ion.

Portions, each of 0.3 g, of a mixture, which had been obtained by mixing 30 g of sodium hydrogensulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 18

One hundred grams of the sodium salt of N-(dithiocarboxy)ethylenediamine and 116.5 g of an epoxyalkane (carbon number: 12) were reacted at 80° C. for 3 hours in 500 g of a 1:1 mixture of water and acetone. After completion of the reaction, the reaction mixture was poured in a large amount of acetone to form a precipitate. The precipitate was collected by filtration. The precipitate was then subjected to reprecipitation three times from a wateracetone system for its purification. It was then dried under reduced pressure, thereby obtaining 165 g of a metal scavenger as pale brown powder. The metal scavenger had a sulfur content of 17.6 wt. %.

Portions, each of 0.3 g, of a mixture, which had been obtained by mixing 30 g of sodium monosulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 19

Charged in a reactor similar to that employed in Example 1 were 120.6 g of the sodium salt of N,N,N'-tris(dithiocarboxy)phenylenediamine, 55.2 g of an epoxyalkane (carbon number: 12) and 500 g of a 1:1 mixture of water and acetone. After reacting them at 80° C. for 4 hours, the reaction mixture was poured in a large amount of acetone to form a precipitate. The precipitate was collected by filtration. After purifying the thus-collected precipitate in the same manner as in Example 18, It was then dried under reduced pressure to obtain 170.5 g of a metal scavenger as pale brown powder. The metal scavenger had a sulfur content of 32.76 wt. %.

Portions, each of 0.4 g, of a mixture, which had been obtained by mixing 20 g of sodium pentasulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 20

Charged in a reactor similar to that employed in Example 1 were 159.0 g of N',N'',N''',N''''-tetrakis(dithiocarboxy)triethylenetetramine, 73.6 g of an epoxyalkane (carbon number: 12) and 500 g of a 1:1 mixture of water and acetone. After reacting them in the same manner as in Example 19, the reaction mixture was purified and dried in the same manner as in Example 19 to obtain 230 g of a metal scavenger as brown powder. The metal scavenger had a sulfur content of 32.8 wt. %.

Portions, each of 0.3 g, of a mixture, which had been obtained by mixing 10 g of sodium monosulfide and 5 g of sodium pentasulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

EXAMPLE 21

Ninety-nine grams of a commercial polyethylenepolyimine (product of Nippon Shokubai Kagaku Kogyo Co., Ltd.; "Epomin SP-003", trade name; molecular weight: about 300) were dissolved in 146 g of ethyl alcohol. While heating the solution to 75° C. and stirring it at the same temperature, 212 g of the epoxyalkane (carbon number: 12) was added dropwise under reflux. After completion of the dropwise addition, the reaction was allowed to proceed at the same temperature for further 2 hours. After completion of the reaction, the reaction mixture was concentrated to obtain 210 g of yellowish crystalline solid matter. Two hundred grams of the thus-obtained crystalline solid matter were comminuted to fine particles and then dispersed in 200 g of water, to which 20 g of sodium hydroxide was added. At 40° C., 32 g of carbon dioxide was added. After completion of the dropwise addition, they were reacted at 40° C. for 2 hours. After completion of the reaction, the resultant insoluble matter was collected by filtration and then washed with water. After washing it further with acetone, it was dried under reduced pressure to obtain 235 g of a metal scavenger as yellow powder. The metal scavenger had a sulfur content of 10.6 wt. %.

Portions, each of 0.5 g, of a mixture, which had been obtained by mixing 10 g of sodium hydrogensulfide with 100 g of the above metal scavenger, were separately added to 1000 ml samples of the same types of aqueous solutions as those employed in Example 1. Following the procedures of Example 1, the floc precipitation time periods, amounts of formed floc, and the concentrations of the metal ions still remaining in the filtrates were measured. Results are shown in Table 2.

COMPARATIVE EXAMPLE 1

To 1000 ml samples of the same types of aqueous solutions as those employed in Example 1, 116-mg portions of the same metal scavenger as that obtained in Example 1 were solely added separately. Following the procedures of Example 1, the floc precipitation time periods, amounts of formed floc, and the concentrations of the metal ions still remaining in the filtrates were measured. Results are shown in Table 3.

COMPARATIVE EXAMPLE 2

To 1000 ml samples of the same types of aqueous solutions as those employed in Example 1, 132-mg portions of sodium diethyldithiocarbamate were added separately. Following the procedures of Example 1, the floc precipitation time periods, amounts of formed floc, and the concentrations of the metal ions still remaining in the filtrates were measured. Results are shown in Table 3.

COMPARATIVE EXAMPLE 3

To 1000 ml samples of the same types of aqueous solutions as those employed in Example 1, 0.3-g portions of the same metal scavenger as that obtained in Example 1 were solely added separately. Following the procedures of Example 1, the floc precipitation time periods, amounts of formed floc, and the concentrations of the metal ions still remaining in the filtrates were measured. Results are shown in Table 3.

TABLE 1

| Example | Floc precipitation time (min.) | | | | Amount of formed floc (ml) | | | | Concentration of metal ions remaining in filtrate (ppm) | | | |
|---|---|---|---|---|---|---|---|---|---|---|---|---|
| | Aq. $Cu^{2+}$ solution | Aq. $Cd^{2+}$ solution | Aq. $Hg^{2+}$ solution | Aq. $Pb^{2+}$ solution | Aq. $Cu^{2+}$ solution | Aq. $Cd^{2+}$ solution | Aq. $Hg^{2+}$ solution | Aq. $Pb^{2+}$ solution | $Cu^{2+}$ | $Cd^{2+}$ | $Hg^{2+}$ | $Pb^{2+}$ |
| 1 | 22 | 22 | 15 | 20 | 18 | 20 | 15 | 20 | 28.5 | 0.06 | 0.010 | 0.4 |
| 2 | 25 | 24 | 17 | 22 | 19 | 22 | 16 | 21 | 27.6 | 0.05 | 0.008 | 0.3 |
| 3 | 22 | 21 | 16 | 20 | 17 | 21 | 15 | 21 | 27.8 | 0.04 | 0.005 | 0.3 |
| 4 | 22 | 22 | 15 | 20 | 18 | 21 | 16 | 20 | 25.4 | 0.04 | 0.003 | 0.2 |
| 5 | 21 | 22 | 15 | 20 | 18 | 22 | 16 | 19 | 26.6 | 0.03 | 0.006 | 0.3 |
| 6 | 20 | 21 | 14 | 18 | 17 | 20 | 15 | 20 | 28.8 | 0.05 | 0.004 | 0.5 |
| 7 | 29 | 28 | 25 | 25 | 22 | 22 | 18 | 26 | 30.5 | 0.09 | 0.018 | 0.8 |
| 8 | 30 | 28 | 26 | 27 | 22 | 25 | 20 | 33 | 32.1 | 0.14 | 0.034 | 0.6 |
| 9 | 23 | 20 | 15 | 19 | 17 | 19 | 13 | 18 | 24.6 | 0.02 | 0.001 | 0.2 |

TABLE 2

| Example | Floc precipitation time (min.) | | | | Amount of formed floc (ml) | | | | Concentration of metal ions remaining in filtrate | | | |
|---|---|---|---|---|---|---|---|---|---|---|---|---|
| | Aq. $Cu^{2+}$ solution | Aq. $Cd^{2+}$ solution | Aq. $Hg^{2+}$ solution | Aq. $Pb^{2+}$ solution | Aq. $Cu^{2+}$ solution | Aq. $Cd^{2+}$ solution | Aq. $Hg^{2+}$ solution | Aq. $Pb^{2+}$ solution | $Cu^{2+}$ (ppm) | $Cd^{2+}$ (ppb) | $Hg^{2+}$ (ppb) | $Pb^{2+}$ (ppb) |
| 10 | 19 | 21 | 13 | 15 | 35 | 30 | 16 | 17 | 2 | 7 | 0.4 | 40 |
| 11 | 16 | 18 | 12 | 14 | 30 | 26 | 14 | 15 | 4 | 27 | 3.4 | 70 |
| 12 | 20 | 22 | 16 | 17 | 34 | 30 | 15 | 15 | 21 | 14 | 2 | 50 |
| 13 | 14 | 17 | 12 | 15 | 33 | 28 | 14 | 15 | 2 | 62 | 1.2 | 90 |
| 14 | 21 | 24 | 16 | 17 | 36 | 31 | 17 | 18 | 3 | 37 | 0.8 | 40 |
| 15 | 13 | 15 | 15 | 16 | 32 | 28 | 16 | 18 | 2 | 62 | 1.5 | 20 |
| 16 | 19 | 23 | 18 | 20 | 35 | 29 | 16 | 18 | 4 | 12 | 2 | 30 |
| 17 | 15 | 17 | 13 | 15 | 32 | 27 | 15 | 17 | 15 | 35 | 1.5 | 90 |
| 18 | 14 | 16 | 13 | 15 | 33 | 27 | 14 | 15 | 6 | 7 | 0.7 | 10 |
| 19 | 18 | 20 | 16 | 17 | 36 | 30 | 18 | 20 | 3 | 35 | 0.3 | 60 |
| 20 | 22 | 21 | 15 | 17 | 35 | 30 | 17 | 18 | 4 | 8 | 5.1 | 70 |
| 21 | 18 | 18 | 15 | 15 | 38 | 33 | 18 | 18 | 9 | 53 | 1.4 | 80 |

TABLE 3

| | Floc precipitation time (min.) | | | | Amount of formed floc (ml) | | | | Concentration of metal ions remaining in filtrate (ppm) | | | |
|---|---|---|---|---|---|---|---|---|---|---|---|---|
| | Aq. $Cu^{2+}$ solution | Aq. $Cd^{2+}$ solution | Aq. $Hg^{2+}$ solution | Aq. $Pb^{2+}$ solution | Aq. $Cu^{2+}$ solution | Aq. $Cd^{2+}$ solution | Aq. $Hg^{2+}$ solution | Aq. $Pb^{2+}$ solution | $Cu^{2+}$ | $Cd^{2+}$ | $Hg^{2+}$ | $Pb^{2+}$ |
| Comp. Ex. 1 | 40 | 38 | 30 | 32 | 75 | 64 | 47 | 50 | 35.1 | 0.192 | 0.042 | 1.3 |
| Comp. Ex. 2 | 45 | 37 | 35 | 40 | 86 | 95 | 73 | 77 | 39.5 | 0.22 | 0.096 | 1.6 |
| Comp. Ex. 3 | 35 | 37 | 31 | 30 | 60 | 44 | 34 | 36 | 20 | 90 | 7 | 150 |

Having now fully described the invention, it will be apparent to one of ordinary skill in the art that many modifications and changes can be made thereto without departing from the spirit or scope of the invention as set forth herein.

We claim:

1. A process for removing heavy metal ions in waste water comprising adding a metal scavenger containing at least one carbodithio group, at least one carbodithioate salt group or at least one carbodithio group and at least one carbodithioate salt group as N-substituents per mole and at least one sodium sulfide selected from the group consisting of sodium monosulfide, sodium polysulfides and sodium hydrogensulfide in a weight ratio of metal scavenger to sodium sulfide of from 20:80 to 98:2 to heavy metal ion containing waste water in an amount of from 0.7 to 4 mole equivalents based on the total amount of heavy metal ions in the waste water, adjusting the pH of the waste water to a pH of 4-9, forming a metal ion containing floc, and removing the floc by filtration.

2. A process according to claim 1, wherein the metal scavenger contains, as an N-substituent, at least one group selected from the group consisting of alkyl groups, β-hydroxyalkyl groups and acyl group.

3. The process of claim 1 wherein said at least one sodium sulfide is sodium hydrogensulfide.

4. The process of claim 1 wherein said at least one sodium sulfide is a sodium polysulfide selected from the group consisting of sodium disulfide, sodium trisulfide, sodium tetrasulfide or sodium pentasulfide.

5. The process of claim 1 wherein the metal scavenger and sodium sulfide is added in a total amount of 0.9 to 1.5 mole equivalents based on the amount of metal ions in the waste water.

6. The process of claim 1 wherein the metal scavenger and the sodium sulfide are mixed together prior to adding to the waste water.

7. The process of claim 1 wherein the metal scavenger and the sodium sulfide are each added separately to the waste water.

8. The process of claim 1 wherein the metal removed from the waste water is selected from the group consisting of mercury, cadmium, zinc, lead copper, chromium, arsenic, gold, silver, platinum, vanadium and thallium.

* * * * *